(12) United States Patent
O'Rourke

(10) Patent No.: US 11,866,836 B2
(45) Date of Patent: Jan. 9, 2024

(54) DISTRIBUTED HYDROGEN GENERATION PLANT

(71) Applicant: Woodside Energy Technologies Pty Ltd, Perth (AU)

(72) Inventor: Shannon O'Rourke, Perth (AU)

(73) Assignee: Woodside Energy Technologies Pty Ltd, Perth (AU)

(*) Notice: Subject to any disclaimer, the term of this patent is extended or adjusted under 35 U.S.C. 154(b) by 0 days.

(21) Appl. No.: 18/167,562

(22) Filed: Feb. 10, 2023

(65) Prior Publication Data
US 2023/0193485 A1  Jun. 22, 2023

Related U.S. Application Data

(63) Continuation of application No. PCT/AU2021/050898, filed on Aug. 13, 2021.

(30) Foreign Application Priority Data

Aug. 14, 2020 (AU) ................ 2020902887

(51) Int. Cl.
*C25B 9/65* (2021.01)
*H02S 10/20* (2014.01)
(Continued)

(52) U.S. Cl.
CPC .............. *C25B 9/65* (2021.01); *C25B 1/04* (2013.01); *C25B 9/70* (2021.01); *C25B 15/083* (2021.01); *C25B 15/085* (2021.01); *H02S 10/20* (2014.12)

(58) Field of Classification Search
CPC ............. C25B 1/04–1/044; E04H 17/017
See application file for complete search history.

(56) References Cited

U.S. PATENT DOCUMENTS

| | | | |
|---|---|---|---|
| 230,925 A * | 8/1880 | Curry | E04H 17/08 256/36 |
| 436,279 A * | 9/1890 | Weiser | E04H 17/12 307/15 |

(Continued)

FOREIGN PATENT DOCUMENTS

| | | | | |
|---|---|---|---|---|
| CH | 717922 A2 * | 4/2022 | ........... | E04H 17/017 |
| CN | 105576803 A * | 5/2016 | ............... | C25B 1/04 |

(Continued)

OTHER PUBLICATIONS

Machine translation of Hotta et al (WO 2018/139616) (Year: 2018).*

(Continued)

*Primary Examiner* — Harry D Wilkins, III
(74) *Attorney, Agent, or Firm* — Edell, Shapiro & Finnan, LLC

(57) ABSTRACT

A distributed hydrogen generating fence is formed from a plurality of electrolysis units and fence posts. Each unit includes one or more PV cells, an associated electrolysis system powered by electricity generated by the one or more PV cells, and a feed header for feeding water and an electrolyte to the electrolysis system. The electrolysis system is inside the feed header, and is operable to produce hydrogen and oxygen. The units are located between and are supported by mutually adjacent fence posts. The feed header extends in an inclined manner between the mutually adjacent fence posts. A gas header conducts at least the hydrogen from each of the plurality of units to a first remote facility. The fence includes openings allowing the passage of animals, people or vehicles. The openings can be controlled by a gate, or a grate laid across a hole in the ground spanning the opening.

22 Claims, 3 Drawing Sheets

(51) Int. Cl.
*C25B 15/08* (2006.01)
*C25B 9/70* (2021.01)
*C25B 1/04* (2021.01)

(56) References Cited

U.S. PATENT DOCUMENTS

| | | | | |
|---|---|---|---|---|
| 500,033 | A * | 6/1893 | Patton | E04H 17/08 |
| | | | | 256/37 |
| 7,674,358 | B2 | 3/2010 | Gibson et al. | |
| 2005/0183962 | A1* | 8/2005 | Oakes | C25B 1/04 |
| | | | | 205/628 |
| 2008/0296545 | A1* | 12/2008 | Chef | F21V 33/006 |
| | | | | 256/1 |
| 2011/0174610 | A1* | 7/2011 | Nomura | C25B 1/55 |
| | | | | 204/252 |
| 2014/0021034 | A1* | 1/2014 | Lewis | C25B 1/55 |
| | | | | 204/267 |
| 2016/0281244 | A1* | 9/2016 | Sato | H01L 31/0322 |
| 2018/0361363 | A1* | 12/2018 | Kobayashi | B01J 35/02 |
| 2019/0112721 | A1* | 4/2019 | Aburaya | C25B 11/051 |
| 2020/0022340 | A1* | 1/2020 | Saue | A01K 61/13 |

FOREIGN PATENT DOCUMENTS

| | | | | |
|---|---|---|---|---|
| CN | 108505699 A | | 9/2018 | |
| WO | WO 2006/077999 A1 * | | 7/2006 | C25B 1/04 |
| WO | WO 2018/139616 A1 * | | 8/2018 | C25B 15/08 |
| WO | WO 2019/238218 A1 * | | 12/2019 | C25B 1/04 |

OTHER PUBLICATIONS

Machine translation of Kubo (WO 2006/077999) (Year: 2006).*
Machine translation of Hoeller (WO 2019/238218) (Year: 2019).*
English abstract of CH 717922 A2, Apr. 2022 (Year: 2022).*
Machine translation of CN 105576803A, May 2016 (Year: 2016).*
International Search Report and Written Opinion in counterpart International Application No. PCT/AU2021/050898, dated Oct. 27, 2021, 11 pages.
International Preliminary Report on Patentability and Written Opinion in counterpart International Application No. PCT/AU2021/050898, dated Aug. 26, 2022, 19 pages.
Researchandmarkets, "Global Hydrogen Generation Market 2017-2018 & 2026: Market Accounted for $103.20 Billion in 2017 and is Expected to Reach $207.48 Billion by 2026", https://www.prnewswire.com/news-releases/global-hydrogen-generation-market-2017-2018-2026-market-accounted-for-103-20-billion-in-2017-and-is-expected-to-reach-207-48-billion-by-2026—300763535.html, Dec. 11, 2018, 7 pages.

* cited by examiner

DISTRIBUTED HYDROGEN GENERATION PLANT

CROSS-REFERENCE TO RELATED APPLICATIONS

This application is a continuation of International Application No. PCT/AU2021/050898, filed Aug. 13, 2021, which claims priority from Australian Patent Application No. 2020902887, filed Aug. 14, 2020, the entire disclosures of which are incorporated herein by reference.

TECHNICAL FIELD

A distributed hydrogen generation plant is disclosed. The distributed hydrogen generation plant may also be viewed as a distributed electrolysis plant.

BACKGROUND

Hydrogen can be produced in different ways including by reforming natural gas and electrolysis. As of circa 2020 about 95% of the world's production of hydrogen was from fossil fuels, with 48% of the 95% being produced by reforming of natural gas. Only about 5% of the hydrogen production at that time was from electrolysis. Fossil fuel derived hydrogen is also accompanied by production of carbon dioxide. There is an expectation that the global market for hydrogen will substantially increase in the near future. "The Global Hydrogen Generation market accounted for $103.20 billion in 2017 and is expected to reach $207.48 billion by 2026 growing at a CAGR of 8.1% from 2017 to 2026." (https://www.prnewswire.com/news-releases/global-hydrogen-generation-market-2017-2018-2026-market-accounted-for-103-20-billion-in-2017-and-is-expected-to-reach-207-48-billion-by-2026-300763535.html)

Electrolysis involves applying an electrical potential difference between electrodes immersed in water. An electrolyte is added to promote and increase electrical conductivity, i.e., electron or ion flow, between the electrodes. When the electrolysis is powered by a green energy source the associated carbon foot print is limited to the once off gaseous carbon production involved in the manufacture of components for the equipment for, and transport and installation of, the electrolysis plant.

One factor limiting the growth of green $H_2$ production by electrolysis is its cost, and in particular, the capex required for the renewable energy plant. Also, the footprint of a plant is typically of a size that cannot easily be located in a suburban environment. Nevertheless, the high cost of construction, installation, and maintenance over time often outweighs the relative low cost of land at remote locations.

The above references to the background art do not constitute an admission that the art forms a part of the common general knowledge of a person of ordinary skill in the art.

SUMMARY

In broad and general terms, the idea or concept behind the disclosed plant is to enable a commercial scale production of hydrogen by a distributed network of electrolysis units. The distributed network may be constructed in the form of a fence which may for example surround a farming or rural property or a mining site or other resources processing/production plant.

In a first aspect there is disclosed a distributed hydrogen generation plant comprising:
a plurality of electrolysis units, each unit having one or more PV cells and an associated electrolysis system powered by electricity generated by the one or more PV cells to generate hydrogen gas and oxygen gas;
a feed header for feeding water and an electrolyte to each of the plurality of units; and
a gas header for conducting at least the hydrogen gas from each of the plurality of units to a first remote facility.

In one embodiment the one or more PV cells in each unit provide a maximum output of ≤100 VDC.

In one embodiment the plant comprises an ultra-low voltage DC (ULVDC) power control system electrically coupled to receive the electricity and arranged to provide a controlled output to the electrolysis system of ≤100 VDC.

In one embodiment the gas header (a) is further arranged to conduct oxygen gas to the first remote facility in a common conduit with the hydrogen gas as a mixture of gases; or (b) comprises a hydrogen conduit for conducting hydrogen gas from each of the plurality of units to the first remote facility and a separate oxygen conduit for conducting oxygen gas from each of the plurality of units to the first remote facility or a different second remote facility.

In one embodiment the gas header is further arranged to conduct oxygen gas to a second remote facility.

In one embodiment the feed header and the gas header are both in fluid communication with a common tank, the tank: holding a supply of water and electrolyte that are fed by the feed header to the plurality of units; and, receiving a return flow of fluid from the units wherein the return flow comprises at least gaseous hydrogen.

In one embodiment the return flow also comprises gaseous oxygen.

In one embodiment the return flow also comprises the electrolyte.

In one embodiment the return flow also comprises the water.

In one embodiment the plant comprises a separation system for separating gaseous hydrogen from gaseous oxygen.

In one embodiment the separation system comprises at least one of: a polymer membrane; a pressure swing absorption process; and, an electrochemical filter.

In one embodiment the electrolysis unit use an alkaline electrolyte.

In one embodiment the one or more PV cells of a unit are connected together in series within the unit.

In one embodiment the one or more PV cells of a unit are connected together in parallel within the unit.

In one embodiment each electrolysis unit is a high pressure electrolysis unit the capable of producing gaseous hydrogen at a pressure of ≥101 MPa at 70° C.

In one embodiment electrolysis unit is a high pressure electrolysis unit the capable of producing gaseous hydrogen at a pressure of ≥20 MPa at 70° C.

In one embodiment the feed header comprises a conduit extending in an inclined plane.

In one embodiment the electrolyser is located within the feed header.

In a second aspect there is disclosed a distributed hydrogen generating fence comprising:
a plurality of electrolysis units, each unit having one or more PV cells, an associated electrolysis system powered by electricity generated by the one or more PV cells and a feed header for feeding water and an electrolyte to the electrolysis system wherein the electrolysis system is disposed in the feed header and is operable to produce hydrogen gas and oxygen gas;

a gas header for conducting at least the hydrogen gas from each of the plurality of units to a first remote facility; and a plurality of fence posts wherein respective units lie between and are supported by mutually adjacent fence posts and the feed header of a corresponding unit extends in an inclined manner between the mutually adjacent fence posts.

In one embodiment the gas header is supported by one or more of the fence posts.

In one embodiment the PV cells are supported on the gas header.

In one embodiment the PV cells are supported by the fence posts.

In one embodiment the one or more PV cells in each unit provide a maximum output of ≤100 VDC.

In one embodiment the fence comprises an ultra-low voltage DC (ULVDC) power control system electrically coupled to receive the electricity and arranged to provide a controlled output to the electrolysis system of ≤100 VDC.

In one embodiment at least some of the units comprise a battery for storing electricity generated by the PV cells and wherein the stored electricity is provided to the electrolysis systems.

In one embodiment all electrical equipment of a unit is powered by a DC voltage and current either directly from the PV cells or a battery charged by the PV cells.

In one embodiment the gas header (a) is further arranged to conduct the oxygen gas to the first remote facility in a common conduit with the hydrogen gas as a mixture of gases; or (b) comprises a hydrogen conduit for conducting hydrogen gas from each of the plurality of units to the first remote facility and a separate oxygen conduit for conducting oxygen gas from each of the plurality of units to the first remote facility.

In one embodiment each unit is provided with a vent to facilitate venting of the oxygen gas to the atmosphere.

In one embodiment the fence includes one or more openings to allow the passage of animals, people or vehicles.

In one embodiment respective openings are controlled by a gate or a grate laid across a hole in the ground spanning the opening.

In one embodiment the fence comprises strands or mesh of material lying in planes on one or both sides of, and connected to, the posts wherein the strands or mesh are arranged to protect at least parts of each unit from damage action of animals or human animals.

In one embodiment the strands or mesh are electrified utilising electricity generated by the PV cells.

BRIEF DESCRIPTION OF THE DRAWINGS

Notwithstanding any other forms which may fall within the scope of the Plant and Fence as set forth in the Summary, specific embodiments will now be described, by way of example only, with reference to becoming drawings in which.

DETAILED DESCRIPTION

Figure 1:
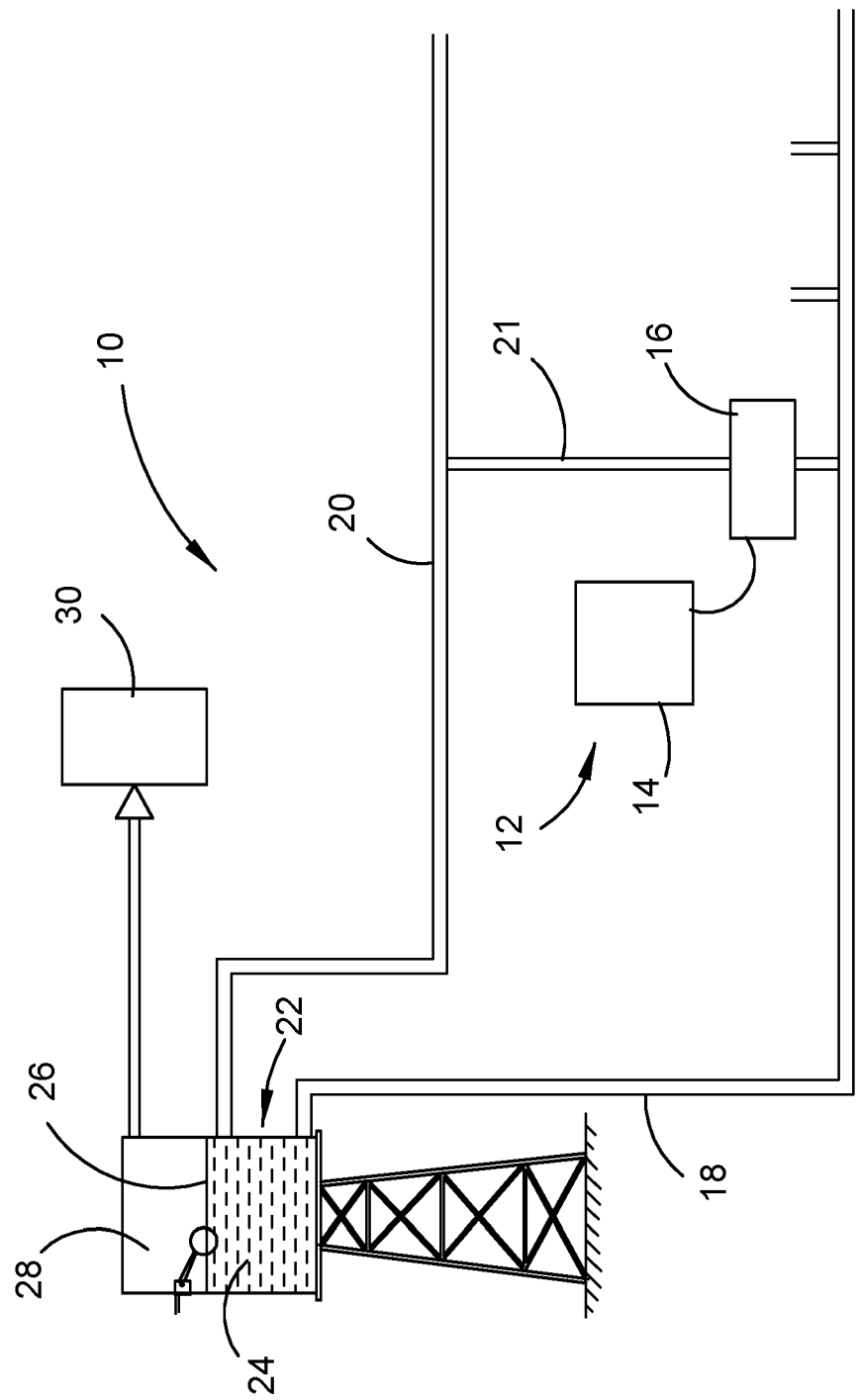
FIG. 1 is a schematic representation of one embodiment of the disclosed distributed hydrogen generation plant.

With reference to FIG. 1 an embodiment of the disclosed distributed hydrogen generation plant 10 comprises a plurality or network, of mutually coupled electrolysis units 12 (only one of which is shown in this Figure). Each unit 12 has one or more PV cells 14 and an associated electrolysis system (or more simply "electrolyser") 16 powered by electricity produced by the one or more PV cells 14. A feed header 18 feeds water and an electrolyte to each of the electrolysers 16. A gas header 20 is coupled with the electrolysers 16 and conducts at least hydrogen gas ($H_2$) from each of the units 12/electrolysers 16 to a remote location where it may be: stored; and/or, subjected to some form of processing such as but not limited to one or more of: separation from other fluids; liquefaction; conversion into hydrogen carrier products such as ammonia, methyl cyclohexane or liquid organic hydrogen carrier; and/or consumed to power a machine, device, system or plant.

Distributed Plant

The plant 10 may be distributed over a wide range of distances from for example hundreds of metres to tens or more of kilometres. The distributed nature is made possible through the provision of: a plurality of individual units 12 each of which can be structured to be fully integrated in terms of generation of power and the electrolysis of water; together with a fluid circulation/reticulation system which includes the feed header 18 and the gas header 20. In the illustrated embodiment the units 12 are connected in parallel. Each electrolyser 16 receives a feed of water and electrolyte through the feed header 18, and one or more of the electrolysis products of each unit 12, most notably hydrogen, is conducted through the gas header 20.

The gas header 20 may include a plurality of connected branches 21 which provide fluid communication paths between respective electrolysers 16 and the gas header 20. The gas header 20 including the branches 21, and any associated connectors (not shown), may be made from materials having a low hydrogen permeability.

The gas header 20 feeds the electrolysis products to a remote location which, in this embodiment, includes a knock out drum/separator 22. The knock out drum 22 holds a supply of a water and electrolyte 24 mixture. The mixture may be maintained at a predetermined level 26 by a level control system such as a float valve. The drum 22 also includes a region 28 above the level 26 for the collection of gaseous fractions such as hydrogen and oxygen which are fed into the knock out drum 22 through the gas header 20. If a mixture of both the hydrogen and oxygen is fed by the gas header 20 to the knock out drum 22, the mixture may be subsequently passed through a filtration system 30 to separate the hydrogen and oxygen. This may include separating the hydrogen and oxygen into separate streams; or absorbing the oxygen in a medium to form a hydrogen stream. The absorbed oxygen can be subsequently collected for separate use or commercialisation. The type of filtration system 30 is not critical to embodiments of the disclosed plant 10. Non-limiting examples of the filtration systems include: a proton exchange membrane system; a pressure swing absorption process; and, an electrochemical filter system.

The gaseous hydrogen and oxygen from the respective electrolysers 16 may also entrain a small volume of water and electrolyte. These are returned to the mixture 24 in the knock out drum 22.

When both oxygen and hydrogen are collected from the units 12/electrolysers 16 they can be conducted together as a mixture within the gas header 20. This would be the case when the electrolyser is one without a membrane separating its anode and cathode. However, in an alternate embodiment the header 20 may include separate channels for conducting the hydrogen and the oxygen in isolation of each other. In yet a further embodiment the oxygen produced at each unit 12/electrolysers 16 may be liberated to atmosphere rather than conducted through the header 20. Each of the last two mentioned embodiments would be suitable for electrolysers having a membrane that separates the electrolyser anode and cathode.

One or more pumps (not shown) may be provided to assist in the circulation of fluids through the headers 18 and 20 and the knock out drum 22. Such pumps may be integrated into each, or selected ones, of the units 12 and powered by electricity produced by the PV cells 14. Moreover, the pressurisation provided by the pumps may be applied to the water and electrolyte within the electrolysers 16 to facilitate an increase in the rate of electrolysis. The pressurisation of the electrolyser also pressurises the devolved hydrogen and oxygen to assists in creating a flow of gases (and entrained liquid) from the electrolysers 16 and through the gas header 20 to the knock out drum 22. In one embodiment it is envisaged that the pumps may operate to provide hydrogen at a pressure of >10 MPa at 70° C.; or >20 MPa at 70° C.

In an alternate arrangement the one or more pumps may be powered by respective PV cells separate to the cells 14 associated with the units 12. It is further envisaged that the one or more pumps may be powered by fuel cells which are fuelled by a fraction of the hydrogen produced by the plant 10.

A separate top-up tank (not shown) may be incorporated in the plant 10 to add electrolyte to the water and electrolyte mixture circulating through the plant. The top up may be automatically controlled to keep the concentration or density of the electrolyte within a predetermined range. The top up of water may also be provided for by coupling the knock out drum 22 with an external water supply such as additional storage tanks, an underground water source, or a mains water scheme.

PV Cells/Plant Power

Each of the units 12 is a stand-alone unit in that its PV cells 14 produce enough electrical energy to power its corresponding electrolyser 16 during daylight hours. Optionally each unit 12 may include an electrical energy storage device (e.g., a rechargeable battery) to store excess energy not consumed during daylight hours by the electrolyser 16. The storage device may be used to support a minimum energy state within the electrolyser enabling zero turn down to keep a minimum voltage (1.49 v) across the anode and cathode with no current flow. All electrically powered equipment and parts of the plant 10/unit 12 (e.g., electrolysers, pumps, sensor, monitoring equipment) can be arranged to run on DC voltage only. In this way the need for a DC to AC inverter is avoided. The assists in reducing overall construction and maintenance costs, as well as increasing reliability.

The PV cells 14 for each unit 12 may comprise a plurality of individual PV cells each generating for example between 2-3 V DC. The cells can be coupled together in a parallel or series arrangement. To enable handling of the electrical side of the plant 10 without the need for qualified electricians it may be desirable for the cells 14 for any particular unit 12 to generate a maximum output of ≤100 VDC or ≤50 VDC.

Each unit 12 may be formed as a power independent unit where the PV cells 14 for the unit constitute the only supply of power for the corresponding electrolyser 16. However, in an alternate arrangement an electrical distribution network may also be incorporated in the plant 10 to enable power-sharing between individual units 12 and possibly rechargeable batteries and/or other the powered devices used within the plant 10 such as pumps and/or heaters.

Metallic frames or supports for the PV cells 14 may be used as conductors for the electrical distribution network. The frames may form part of a single wire earth return electrical distribution network. This would entail the frames or supports being connected together by a bus or common wire. A benefit of such a system is that there is no need for a second conductor or neutral wire to act as a return path for electrical current. In this instance the earth itself acts as the return path.

The frames or supports for the PV cells can be arranged to allow for the control of the inclination or positioning of the PV cells for example to facilitate sun tracking. This may also be achieved by use of bifacial PV cells. Any frame or support used for the PV cells may also be arranged to facilitate weather protection for example during the cyclone to move or position the PV cells in a manner to minimise risk of damage.

In addition, or as an alternate, to the electrically powered heaters mentioned above, solar thermal heaters may be used to heat the water and electrolyte mixture. Such solar heaters may be incorporated in or on the knock out drum. The header 18 and/or 20 can also be conditioned or formed to act as solar thermal heaters. For example, the headers can be made of a matt black coloured conduit to absorb solar radiant energy. The purpose of this is to heat the water and electrolyte to improve the efficiency/rate of production of hydrogen.

Electrolyser

The electrolysers may comprise unipolar cells or bipolar cells. The selection of materials for the electrodes is governed in part by the type of electrolyte. For an alkaline electrolyser that uses potassium hydroxide or sodium hydroxide, electrode materials may include, but are not limited to nickel alloys, platinum alloys or stainless steel. To improve efficiency various catalysts or coatings may be applied to the electrodes, for example cobalt may be added to the anode while iron and vanadium may be used at the cathode.

Coatings may also be applied to assist in dislodging gas bubbles from the surfaces of the electrodes. In addition, or alternately other strategies and systems may be used to help in dislodging gas bubbles. These include mechanical vibration of the electrode by use of ultra-sonic mechanical/electromechanical devices; and/or, impressing an alternating current (AC) on the direct current (DC) used to drive the electrolysers 16.

The electrodes may be separated by a membrane or diaphragm which allows a flow of water and hydroxyl ions between respective anode and the cathode compartments while keeping the hydrogen and oxygen gases separated. The membrane or diaphragm may be made from: composite materials based on ceramic materials or microporous materials; reinforced microporous PES membranes; glass reinforced polyphenylene sulphide compounds; nickel oxide layers on a mesh with titanium oxide and potassium titanate.

The casing or body of the electrolysers 16 as well as the electrodes may be made of recyclable materials.

Now that an embodiment has been described, it should be appreciated that the distributed hydrogen generation plant maybe embodied in many other forms. One such form is exemplified in FIGS. 2 and 3. The same reference numbers as used in the embodiment shown in FIG. 1 will be used to denote the same, or functionally equivalent features, of the plant 10 shown in FIGS. 2 and 3.

Figure 2:
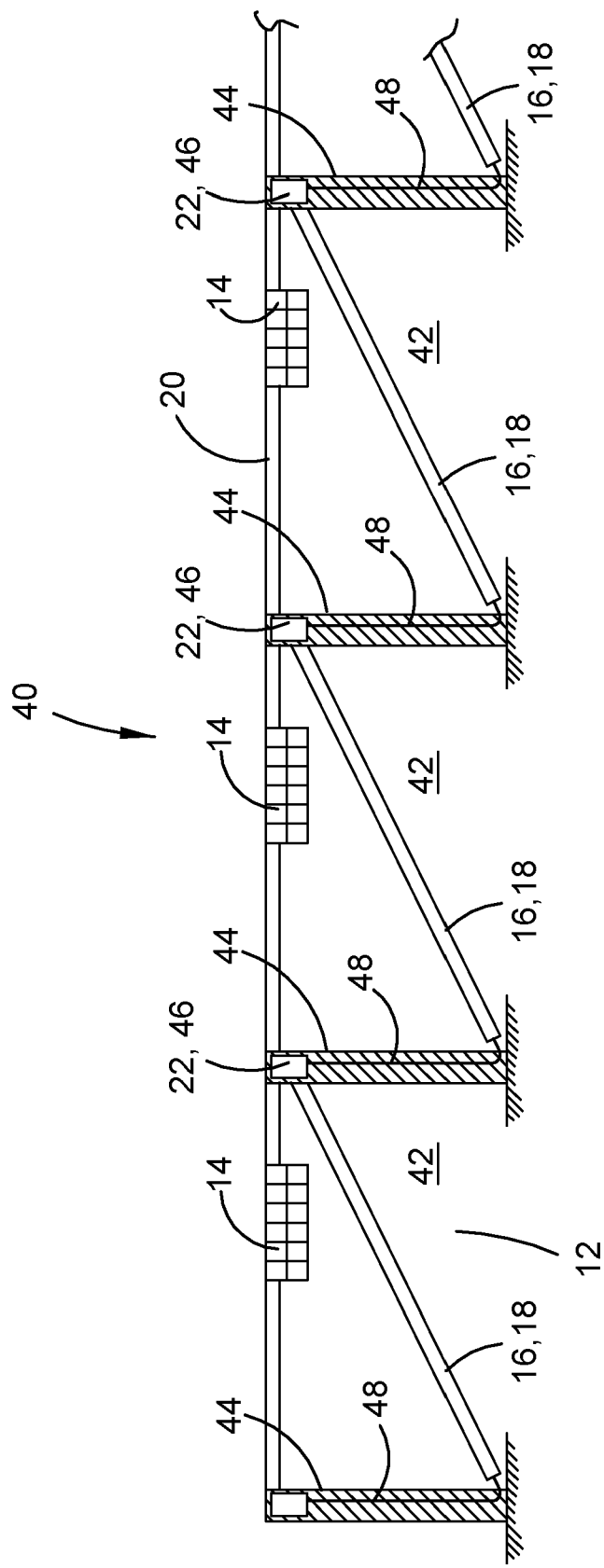
FIG. 2 is a schematic representation of an embodiment of the disclosed distributed hydrogen generation plant in the form of a fence.
Figure 3:
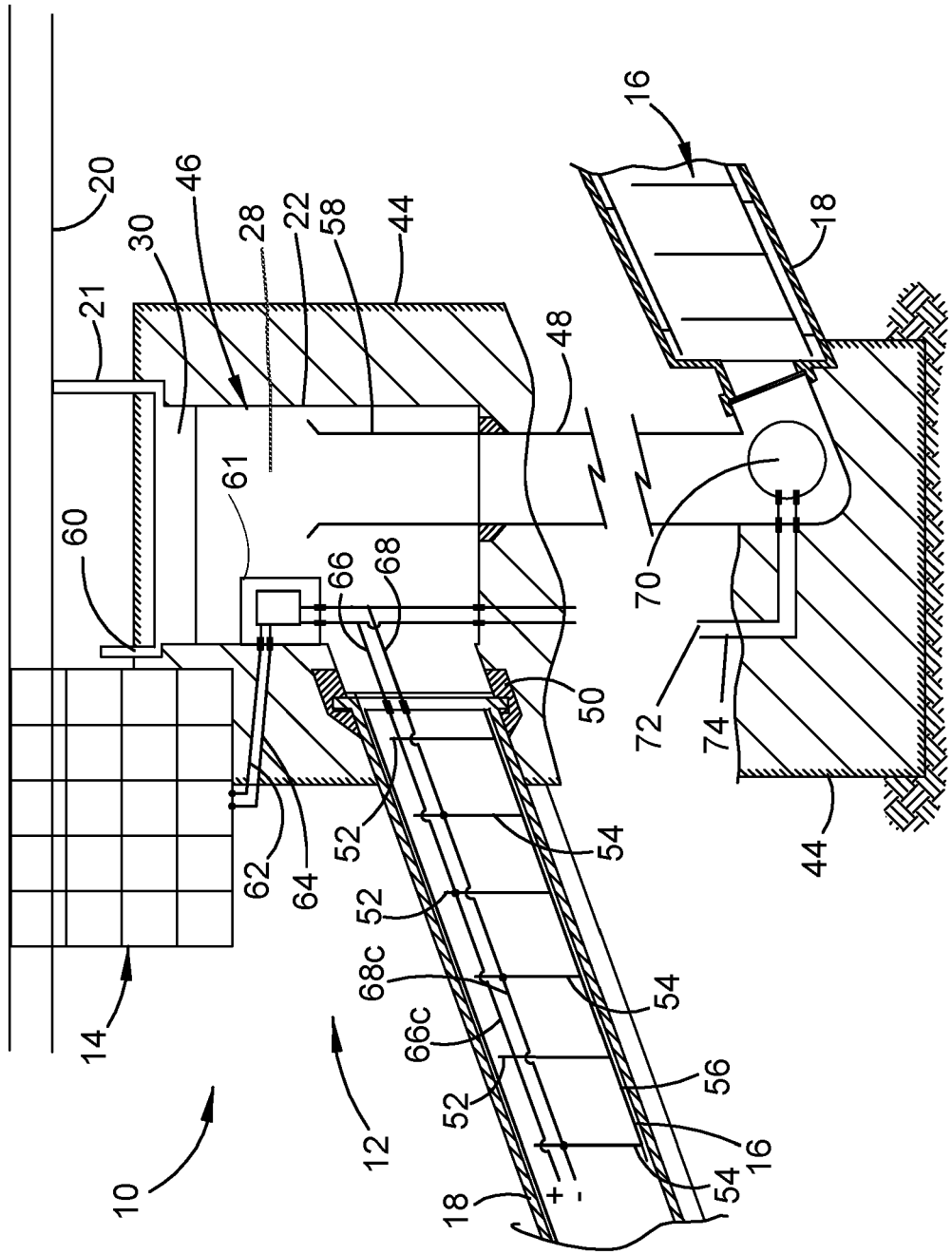
FIG. 3 is an enlarged partial section view of a portion of the fence is shown in FIG. 2.

The embodiment of the plant 10 shown in FIGS. 2 and 3 is in the form of a fence 40 that may extend for hundreds of metres to tens or more of kilometres. The fence 40 is notionally divided into of a plurality of panels 42 each panel being demarked by a pair of spaced apart fence posts 44. In this embodiment each unit 12 comprises an array of PV cells 14; and a corresponding electrolyser 16. The cells 14 are suspended on a gas header 20 that extends between the fence posts 44. The electrolyser 16 is located within the feed header 18

The feed header 18 is in the form of a pipe for example, but not limited to, a 50 mm or 80 mm diameter high density polyethylene pipe. The pipe may be off-the-shelf irrigation pipe. The electrolysers 16 (shown in FIG. 3) may be in the form of cartridges which are inserted into the header 18. The header 18 extends diagonally between a lower end of one post 44 to an upper end of an adjacent post 44. At the upper end the header 18 is coupled to a connection box 46 which incorporates a knock out drum 22. Water and electrolyte enter the connection box 46 together with oxygen and hydrogen gas formed by electrolysis of the water. The water and electrolyte flow by gravity from the knock out drum 22 through a coupling hose 48 to the unit 12 in the next adjacent panel 42. Thus, in this embodiment of the flow of water and electrolyte is a series flow rather than a parallel flow shown in FIG. 1.

FIG. 3 shows an enlarged partial section view of a portion of the plant 10 at opposite ends of a common fence post 44. On the left-hand side, an upper end of a header 18 is shown coupled to a connection box 46 by a threaded hose connector 50. A part of an electrolyser 16 can be seen inside of the header 18. Here the electrolyser 16 is a membraneless unipolar electrolyser with a set of anodes 52 connected in series and interleaved with a set of series connected cathodes 54.

As previously mentioned, the electrolyser 16 is in the form of a cartridge that is inserted into the header 18. The cartridge includes an outer body 56 that may be of a cylindrical configuration and which supports the electrodes 52, 54. The outer body 56 is provided with a plurality of holes (not shown) to allow the water and electrolyte to flow through the cartridge and be acted upon by the potential difference between the anodes and cathodes 52, 54. The water and electrolyte are pumped or pressurised to flow upwardly through the header 18 into the connection box 46 and knock out drum 22. Gaseous hydrogen and oxygen also flow into the connection box 46 by the combined action of their buoyancy and being entrained in the water/electrolyte flow.

A weir 58 in the form of an upstanding pipe is provided in the knock out drum 22. When water reaches the top of the weir 58 it flows down the weir into a coupling hose 48 and subsequently to the header 18 and electrolyser 16 of the unit 12 in the next adjacent panel 42. Within the knock out drum 22 there is a space 28 for collection of the mixed hydrogen and oxygen. The hydrogen and oxygen pass through a filtration system 30. Hydrogen is directed through a connection branch 21 into the gas header 20. In this embodiment oxygen is allowed to escape to the atmosphere through a vent 60 which is in fluid communication with the filtration system 30.

Housed within the connection box 46/knock out drum 22 is a power control system 61 which incorporates electronic circuits and optionally a rechargeable battery. The PV cells 14 are connected by wires 62 and 64 to the power control system 61. Insulated connectors 66 and 68 also electrically connect the anodes and cathodes 52, 54 to the power control system 61. Conductors 66c and 68c which electrically connect the anodes 52 and the cathodes 54 to the connectors 66 and 68 respectively, may be encapsulated in an electrically insulating material.

In this embodiment a pump 70 is connected between the hose 48 and the header 18. The pump 70 drives the water to flow up the next adjacent header 18. It should be understood that an elevated supply tank holding a volume of water and electrolyte may be provided at one or more locations along the length of the fence to facilitate gravity feed of water for the entirety of the length of the fence 40. Therefore, in some embodiments there may be no need for the use of any pumps 70. In other embodiments, pumps 70 can be provided to boost water and gas pressure throughout the system at designated locations along the length of the fence 40, for example, but not limited to every 50 m, or 100 m, or 200 m, or 1000 m. The pumps 70 when incorporated in the plant 10 can be powered by electricity generated by the PV cells 14. Wires 72, 74 from the pump 70 can be connected to (a) a battery within the connection box 46, or to the cells 14 either directly or via the power control system 61.

The PV cells 14 used in this (or any) embodiment may be in the form of perovskite solar cells (PSC) printed onto flexible material. The material can be draped over and fastened onto frames supported on the gas header 20. PSC's degrade more quickly than silicon-based PV cells. Nevertheless, due to their higher efficiency, low production cost and relative ease of replacement they provide a viable power source for embodiments of the plant 10 particularly when incorporated into a fence in rural or remote locations. The ability to construct a plant 10 in the configuration of a fence 40 at low cost is facilitated at least in part by the use of off-the-shelf piping, hoses and connectors which are used in water reticulation systems and readily available in suburban areas, and at rural or outback locations.

The fence 40 may be enhanced in terms of performance as a fence, i.e., a structure to control or prevent access between areas of land, by incorporating wire or the like strands or mesh on one or both sides of the posts 44. For example, the headers 18 may lie within the depth of the posts 44 with strands or mesh of material (for example, but not limited to, wire) lying in planes on one or both sides of the posts 44. The strands/mesh may rely on their mechanical properties to provide protection to the headers 18 and other components of the plant 10 from damage for example by animals. Additionally, or alternately the strands or mesh may also be electrified utilising electricity generated by the PV cells 14.

Embodiments of the fence may also have one or more openings along its length to allow the passage of people, vehicles or animals. Across an opening the headers 18 and 20 can be buried underground to provide a continuous flow of their respective fluids between the panels 42 on opposite sides of the opening. Alternately the headers 18 and 20 can be terminated at opposite sides of the opening. In that event the different sections of fence on opposite sides of the opening may require their own supply of water and electrolyte, and have separate flow paths from their respective gas headers to the remote locations where the electrolysis gases are processed.

An opening can be controlled by a gate, or grate laid across a hole in the ground spanning the opening. The grate can be designed for example to prevent passage of sheep or other animals but allow people and vehicles to pass.

The fence 40 may be inspected from time to time in the same manner as a rural or remote fence, for example by: maintenance personnel driving along the fence; use of unmanned vehicles including aerial drones; and/or the incorporation of cameras and other sensors along the fence.

In the fence 40, each of the headers 18 extend in an inclined manner between mutually adjacent posts 44. Along the length of the fence 14 the headers 18 are generally parallel with each other. A single header 18 and associated connection box 46 is shown extending between mutually adjacent posts 44. However, in other embodiments a plurality of headers 18 and associated connection boxes 46, may be arranged between mutually adjacent posts 44. In such an embodiment hydrogen produced by a second or further header 18 and associated electrolyser 16 may be fed into a common single gas header 20. In one example the distance between adjacent posts 44 in the fence 40 may be, but not limited to, between 2-10 m.

In another variation the PV cells 14 can be dimensioned to cover other parts of a corresponding unit 12 for example the connection box 46 and, a length, including substantially the full length, of the header 18. This covering can be provided on one, but preferably both, sides of a respective unit 12. A maximum covering is obtained by arranging the PV cells to cover a unit 12 from the top of its associated adjacent posts 44 to a location at or near the ground.

Dimensioning the PV cells in the manner suggested provides greater surface area and thus increases electrical energy output. In addition, covering provided by the cells 14 can provide a degree of insulation and/or weather protection for the remaining components of the unit 12. In one example a frame or beam can be arranged to extend between mutually adjacent posts 44 to provide a support for the PV cells 14. Mechanical load on the frame or beam can be minimised by providing the PV cells as perovskite solar cells (PSC). Nevertheless, other forms of PV cells can be used in this manner.

In the claims which follow, and in the preceding description, except where the context requires otherwise due to express language or necessary implication, the word "comprise" and variations such as "comprises" or "comprising" are used in an inclusive sense, i.e., to specify the presence of the stated features but not to preclude the presence or addition of further features in various embodiments of the system and method as disclosed herein.

What is claimed:

1. A distributed hydrogen generating fence comprising:
    a plurality of electrolysis units, each electrolysis unit including one or more photovoltaic (PV) cells, an electrolysis system powered by electricity generated by the one or more PV cells, and a feed header configured to enable a water and electrolyte mixture to be supplied to the electrolysis system, wherein the electrolysis system is disposed in the feed header and is operable to produce hydrogen gas and oxygen gas;
    a gas header for conducting the hydrogen gas from each of the plurality of electrolysis units to a first remote facility; and
    a fence including a plurality of fence posts, wherein respective electrolysis units lie between and are supported by mutually adjacent fence posts, and the feed header of a corresponding electrolysis unit extends in an inclined manner between the mutually adjacent fence posts.

2. The distributed hydrogen generating fence according to claim 1, wherein the gas header is supported by one or more of the fence posts.

3. The distributed hydrogen generating fence according to claim 1, wherein the PV cells are supported: (a) on the gas header; or (b) by the fence posts.

4. The distributed hydrogen generating fence according to claim 1, wherein the one or more PV cells in each unit provide a maximum output of <100 VDC.

5. The distributed hydrogen generating fence according to claim 1, wherein at least some of the electrolysis units comprise a battery for storing electricity generated by the PV cells and wherein the stored electricity is provided to the electrolysis systems.

6. The distributed hydrogen generating fence according to claim 5, wherein all electrical equipment of an electrolysis unit is powered by a DC voltage and current either directly from the PV cells or the battery.

7. The distributed hydrogen generating fence according to claim 1, wherein the gas header comprises a hydrogen conduit for conducting hydrogen gas from each of the plurality of units to the first remote facility and a separate oxygen conduit for conducting oxygen gas from each of the plurality of units to the first remote facility.

8. The distributed hydrogen generating fence according to claim 1, wherein each electrolysis unit is provided with a vent to facilitate venting of the oxygen gas to the atmosphere.

9. The distributed hydrogen generating fence according to claim 1, wherein the fence includes one or more openings to allow the passage of animals, people or vehicles.

10. The distributed hydrogen generating fence according claim 9, wherein respective openings are controlled by: a gate; or, a grate laid across a hole in the ground; spanning the opening.

11. The distributed hydrogen generating fence according to claim 1, further comprising strands or mesh of material lying in planes on one or both sides of, and connected to, the posts wherein the strands or mesh are arranged to protect at least parts of each unit from damage action of animals or human animals.

12. The distributed hydrogen generating fence according to claim 11, wherein the strands or mesh are electrified utilising electricity generated by the PV cells.

13. The distributed hydrogen generating fence according to claim 1, wherein the PV cells are provided on a flexible material.

14. The distributed hydrogen generating fence according to claim 1, further comprising for each pair of mutually adjacent electrolysis units along the fence, a knock out drum in fluid communication with: (a) a feed header of an upstream electrolysis unit in the pair of mutually adjacent electrolysis units; and, (b) a feed header of a downstream electrolysis unit in the pair of mutually adjacent electrolysis units, wherein the water and electrolyte mixture is able to flow through the feed header of the upstream electrolysis unit through the knock out drum and into the feed header of the downstream electrolysis unit.

15. The distributed hydrogen generating fence according to claim 14, wherein the gas header is in fluid communication with a plurality of knock out drums to conduct hydrogen produced by the electrolysis units to the first remote location.

16. A distributed hydrogen generating fence comprising:
    a fence including: a plurality of spaced fence posts;
    at least first and second electrolysis units, each electrolysis unit including one or more PV cells, an associated electrolysis system powered by electricity generated by the one or more PV cells and a feed header for feeding water and an electrolyte to the electrolysis system operable to produce hydrogen gas and oxygen gas;
    wherein the feed header of the first electrolysis unit extends between a first and second of the fence posts, and the feed header of the second electrolysis unit extends between the second and a third of the fence posts;

a knock out drum, wherein the knock out drum is in fluid communication with the feed headers of each of first and second electrolysis units to enable a water and electrolyte mixture to flow from the first electrolysis unit to the second electrolysis unit; and a gas header in fluid communication with the knock out drum for conducting the hydrogen gas from each of the first electrolysis unit to a first remote facility.

17. The distributed hydrogen generating fence according to claim 16, wherein the gas header is supported by the fence.

18. The distributed hydrogen generating fence according to claim 16, wherein the PV cells are supported: (a) on the gas header; or, (b) by the fence posts.

19. The distributed hydrogen generating fence according to claim 16, wherein the PV cells are provided on a flexible material.

20. The distributed hydrogen generating fence according to claim 16, wherein the knock out drum includes a vent to facilitate venting of the oxygen gas to the atmosphere.

21. The distributed hydrogen generating fence according to claim 16, wherein the fence includes one or more openings to allow the passage of animals, people or vehicles.

22. The distributed hydrogen generating fence according claim 21, wherein respective openings are controlled by: a gate; or, a grate laid across a hole in the ground; spanning the opening.

\* \* \* \* \*